July 12, 1932.  W. G. KIFER  1,866,936
ROLLER BEARING AND CAGE THEREFOR
Filed July 17, 1929
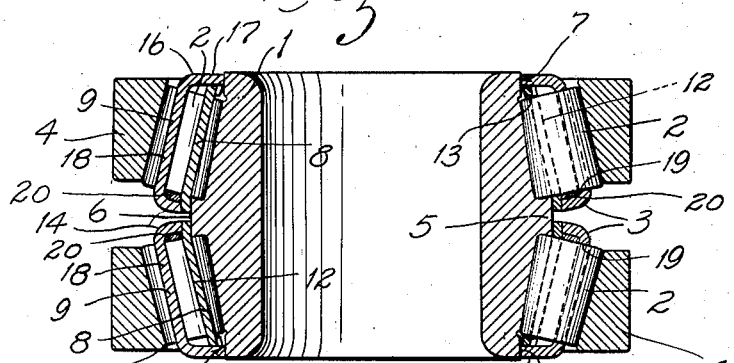
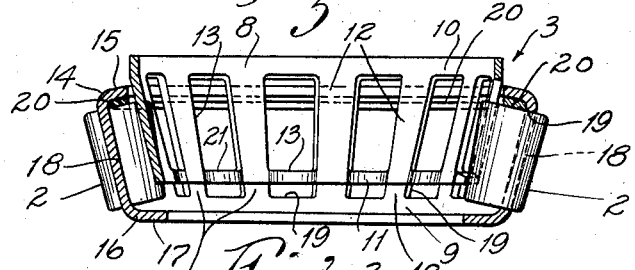
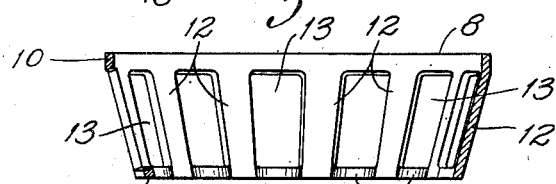
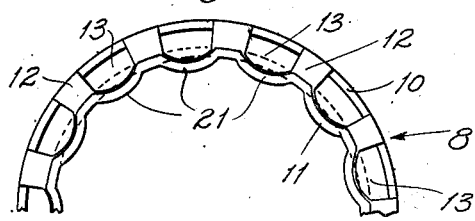
INVENTOR:
Ward G. Kifer,
by Carr Plan Gravely,
HIS ATTORNEYS.

Patented July 12, 1932

1,866,936

UNITED STATES PATENT OFFICE

WARD G. KIFER, OF CANTON, OHIO, ASSIGNOR TO THE TIMKEN ROLLER BEARING COMPANY, OF CANTON, OHIO, A CORPORATION OF OHIO

ROLLER BEARING AND CAGE THEREFOR

Application filed July 17, 1929. Serial No. 378,853.

My invention relates to roller bearings, particularly conical roller bearings, and to cages therefor; and has for its principal object a construction in which the cage and rollers form a self-contained unit, in which the rollers are accurately guided, in which the cage is properly positioned and the load thereof taken off the rollers and in which the parts are easily assembled. The invention consists principally in the roller bearing and cage therefor and in the parts and combinations and arrangements of parts hereinafter described and claimed.

In the accompanying drawing,

Fig. 1 is a longitudinal sectional view of a roller bearing and cage therefor embodying my invention, Fig. 2 is a sectional view of the cage and rollers during the operation of assembling them, only two rollers being illustrated in the drawing, Fig. 3 is a detail view of the inner cage member, and Fig. 4 is a portion of the small end of said inner cage member before assembly of the bearing.

In the drawing is illustrated a conical roller bearing comprising an inner bearing member or cone 1, conical rollers 2 thereon, a cage 3 for said rollers and a cup or outer bearing member 4.

The bearing cone 1 has a thrust rib 5 at its large end against which the large ends of the rollers 2 abut. The outer surface 6 of said thrust rib is preferably cylindrical. At the small end of the bearing cone 1 is a cylindrical portion 7.

The cage 3 consists of an inside shell 8 and an outside shell 9. The inside shell is of generally conical form with a large end ring 10 and a small end ring 11 connected by bridge members 12 whereby conical pockets 13 are formed for the rollers. The outer shell 9 of the cage comprises a large end ring portion 14 having an inwardly projecting flange 15 and a small end ring portion 16 having an inwardly projecting flange 17 and connecting bridges 18 forming pockets 19 for the rollers. The large end ring 10 of the inside cage member 8 preferably has cylindrical inner and outer surfaces, its outside dimensions being such that it fits closely in the inturned flange 15 of the large end ring 14 of the outer cage member. The small end ring 11 of the inner cage member 8 rests against the inside face of the small end flange 17 of the outer cage member 9. A wear ring 20 of brass or other suitable material is placed over the large ends of the rollers 2, fitting in a recess formed by the large end ring 14 and flange 15 of the outer cage member 9 and the large end ring 10 of the inner cage member.

In order to facilitate assembly, the small end ring 11 of the inner cage member 8 is preferably provided with crimped portions 21 conforming to the outside curvature of the rollers 2. Thus the rollers 2 may be placed in the pockets 19 of the outer cage member 9, (the pockets being small enough that the rollers cannot pass therethrough), the wear ring 20 positioned over the large ends of the rollers 2 and the inner cage member 8 inserted in place, the crimped end portions 21 snapping over the small ends of the rollers. After assembly, the crimped portions 21 are forced outwardly sufficiently to enable the small end ring 11 to clear the small end 7 of the cone 1, so that the end ring 11 of the assembled cage is of substantially circular form.

The cylindrical portion of the large end ring 10 of the inner cage member 8 rides on the cylindrical surface 6 of said thrust rib 5 and the cylindrical inner edge portion of the small end flange 17 of the outer cage member 9 rides on the cylindrical portion 7 of said cone 1. Thus the rollers are relieved of the weight of the cage.

The cage and rollers form a self-contained unit that is easily mounted on the cone and whose parts are easily assembled. Wear on the cage is reduced, as is interference of the cage with true running of the rollers.

What I claim is:

1. A cage for conical roller bearings comprising an outer conical shell having pockets in which the conical rollers fit, and having inturned flanges at each end, and an inner conical shell having corresponding roller pockets and having its small end abutting against the inside face of the small end flange of said outer shell and having its large end ring fitting snugly in the large end ring of said outer shell, said small end ring originally having crimped portions corresponding in curvature to said rollers to facilitate assembly of the cage and rollers.

2. A conical roller bearing comprising an inner bearing cone having a rib at its large end whose outer surface is cylindrical and having a cylindrical surface at its small end, an outer conical cage member having inturned flanges at its ends, conical pockets in said outer cage member, conical rollers in said pockets, and an inner conical cage member having a large end ring fitting snugly inside said large end flange of said outer cage and fitting snugly over said cylindrical surface of said cone rib, said inner cage member also having a small end ring abutting against the inside face of said small end flange of said outer cage member, said small end flange fitting snugly on said cylindrical surface at the small end of said cone.

3. A conical roller bearing comprising an inner bearing cone having a rib at its large end whose outer surface is cylindrical and having a cylindrical surface at its small end, an outer conical cage member having inturned flanges at its ends, conical pockets in said outer cage member, conical rollers in said pockets, an inner conical cage member having a large end ring fitting snugly inside said large end flange of said outer cage and fitting snugly over said cylindrical surface of said cone rib, said inner cage member also having a small end ring abutting against the inside face of said small end flange of said outer cage member, said small end flange fitting snugly on said cylindrical surface at the small end of said cone and a wear ring engaging the large ends of said rollers and held by said cage members.

Signed at Canton, Ohio, this 12th day of July, 1929.

WARD G. KIFER.